United States Patent
Carnahan et al.

(12)

(10) Patent No.: US 6,560,557 B1
(45) Date of Patent: May 6, 2003

(54) SYSTEM AND METHOD FOR REMOTE DEMONSTRATION AND CONTROL OF TEST AND MEASUREMENT DEVICES

(75) Inventors: Lyle Carnahan, Loveland, CO (US); Marc Raymond Geoffroy, Aurora, CO (US); Eric Dodge Littlefield, Parker, CO (US); Charles Lewis Wardin, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/396,638

(22) Filed: Sep. 15, 1999

(51) Int. Cl.[7] .............................................. G06F 19/00
(52) U.S. Cl. ....................... 702/122; 702/123; 370/230; 370/252
(58) Field of Search .................................. 702/120, 121, 702/122, 123; 709/201–203, 217–219, 223, 227, 230, 249–250; 379/26.01, 26.02, 27.04, 29.01; 370/229–230, 235, 252, 270

(56) References Cited

U.S. PATENT DOCUMENTS

| | | | | |
|---|---|---|---|---|
| 5,708,654 A | * | 1/1998 | Arndt et al. ................ 370/242 |
| 5,724,510 A | * | 3/1998 | Arndt et al. ................ 709/220 |
| 5,917,808 A | * | 6/1999 | Kosbab ...................... 370/254 |
| 5,982,753 A | * | 11/1999 | Pendleton et al. .......... 709/223 |
| 6,002,671 A | * | 12/1999 | Kahkoska et al. ............ 379/27 |

\* cited by examiner

*Primary Examiner*—Bryan Bui

(57) ABSTRACT

A system and method are described for providing remote demonstration and control of a test and measurement device. The system provides for user to request active instrument panel pages for a test and measurement device from a server. The server includes logic that emulates a test and measurement device instrument panel and provides constant update of the instrument panel page data regarding the remote control of the test and measurement device. The server in the correct message format provides the request for updated status data from a remote controlled instrument, for the selected remotely controlled test and measurement device. The server issues the received remote control requests to the remote controlled instrument. The remote controlled instrument provides data and reacts to commands received. The instrument, upon receiving a command or request for instrument state data, transmits said instrument state data to the server for further transmission to the client user interface for further display to a user.

17 Claims, 12 Drawing Sheets

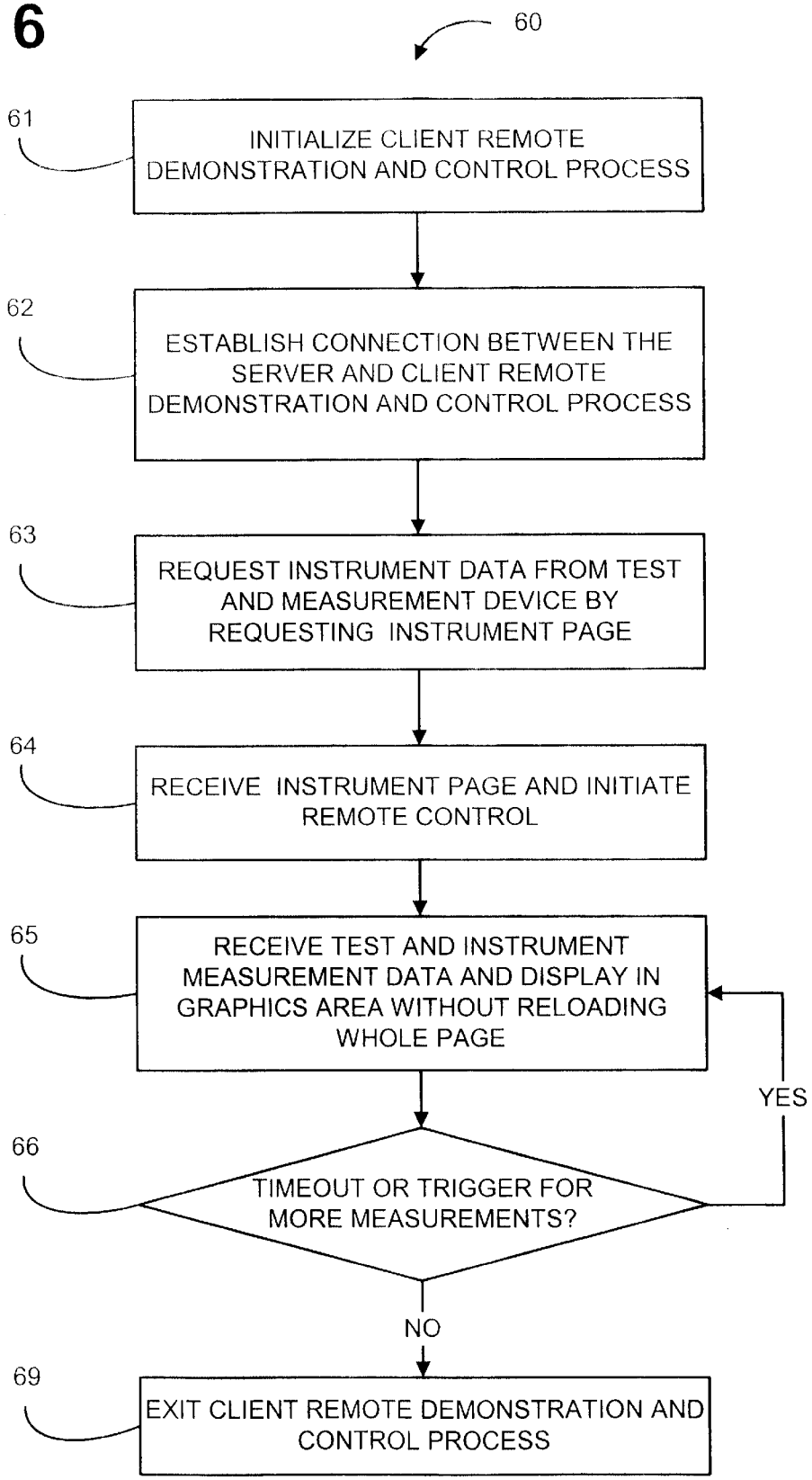

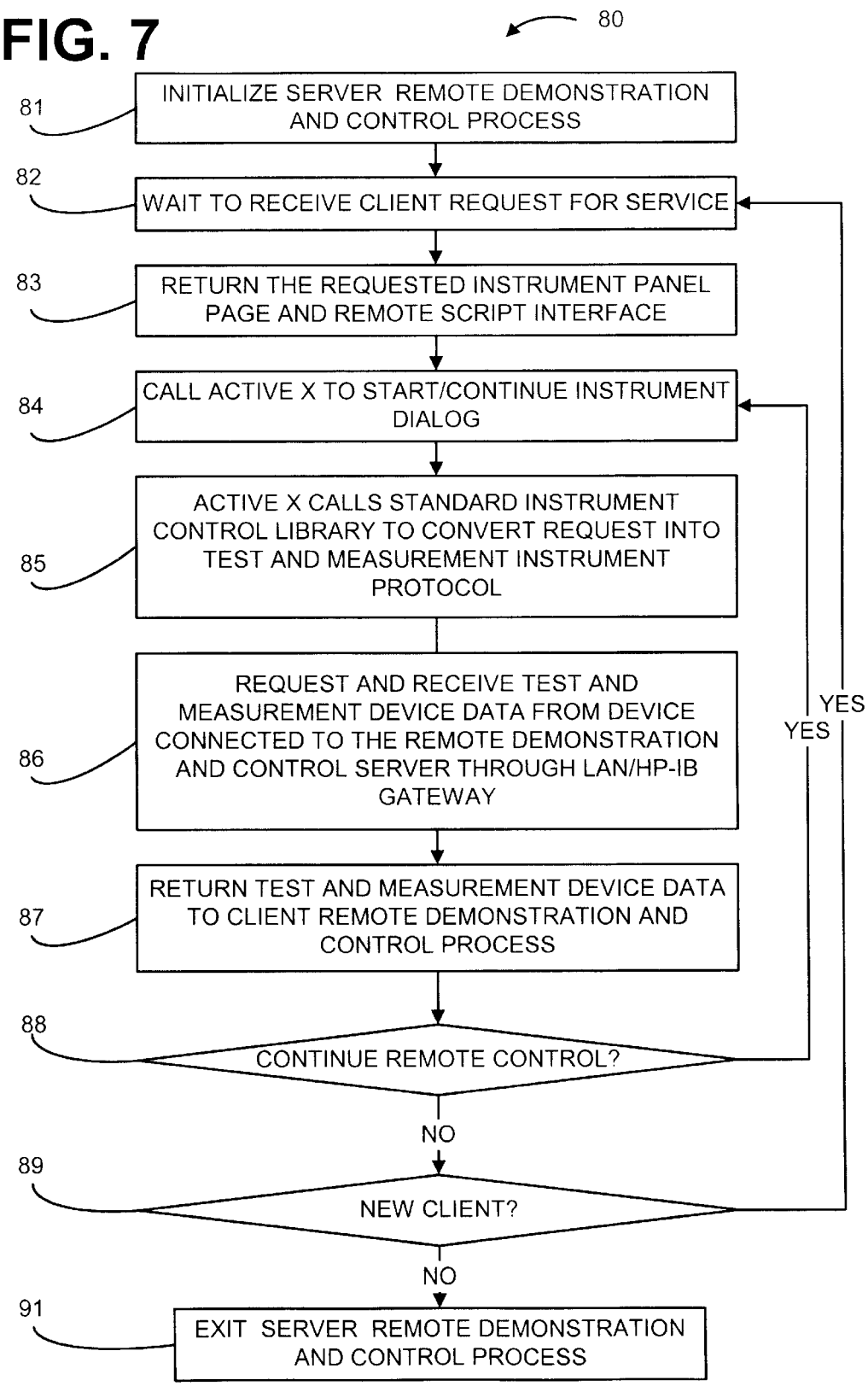

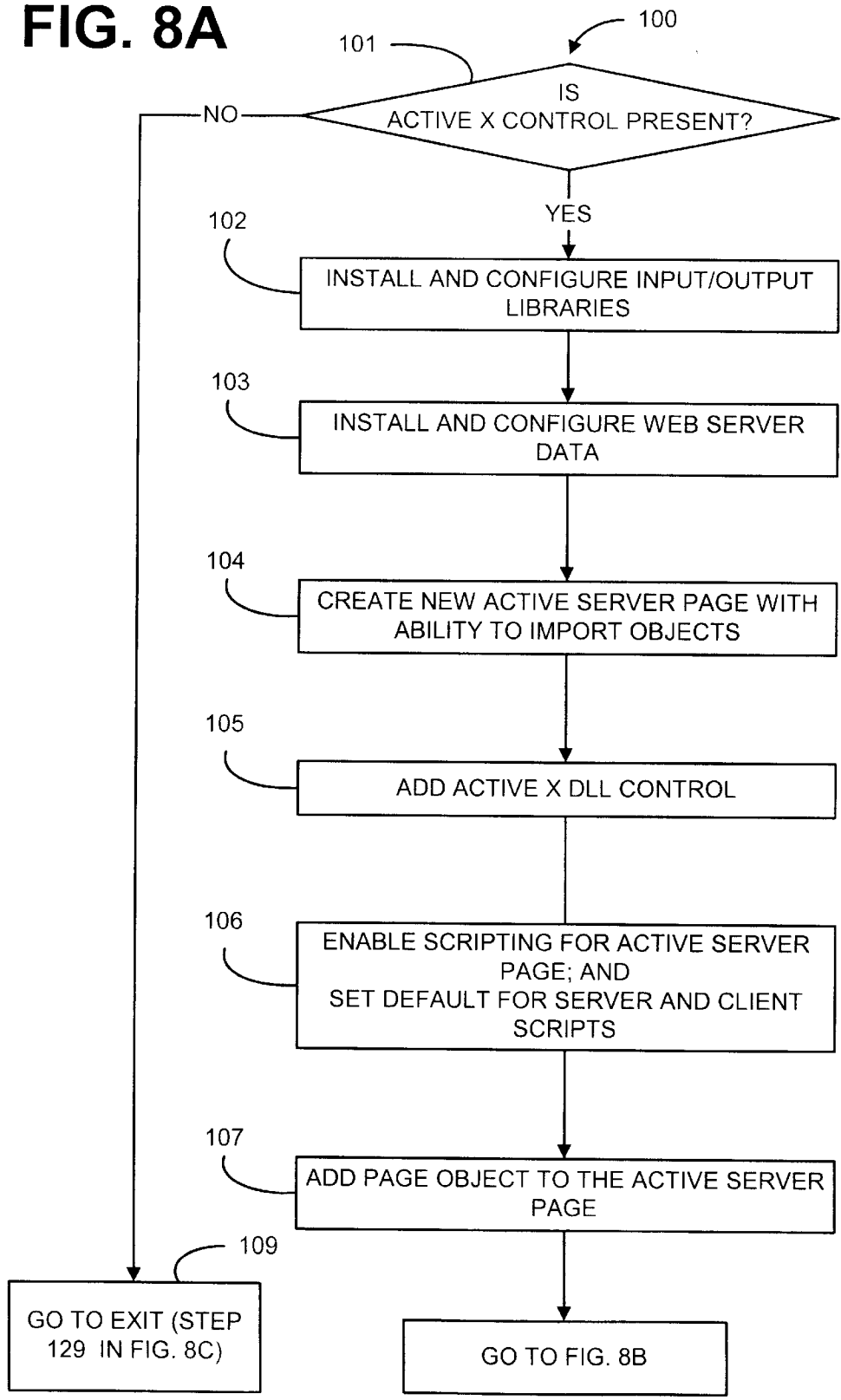

SYSTEM AND METHOD FOR REMOTE DEMONSTRATION AND CONTROL OF TEST AND MEASUREMENT DEVICES

BACKGROUND OF THE INVENTION

1. Field of the Invention

The present invention generally relates to a system and method for providing remote demonstration and control of test and measurement devices. Specifically, the system and method of the present invention provide a system engineered to provide remote demonstration and control of test and measurement devices at a remote site.

2. Description of Related Art

As is known in the electrical arts, when a new electrical device is developed or being utilized, the system device can exhibit errors. As a consequence, developers and users of these new electrical devices can utilize many techniques to verify proper operation of the electronic device and diagnose these errors. One of the many techniques used is a test and measurement device. The use of test and measurement devices have many drawbacks and can be difficult to use efficiently. One of the more difficult tasks when using a test and measurement device has been determining which test and measurement device to use and how to properly and efficiently use it. Many test and measurement device vendors have dealt with this issue by providing sales and equipment documentation describing the manner in which to connect and use the test and measurement device.

However, some of the documentation may be difficult to follow, making it difficult for developers and users of an electronic device to determine which test and measurement device to use and how to best use it. In these cases, many developers and users resort to contacting the vendor of the test and measurement device to request help in determining which test and measurement device to use and how best to use it.

When demonstrating test and measurement devices, it is often desirable to experiment with a test and measurement device prior to purchase. Commonly, a user reviews a catalog or web page and calls for sales and technical assistance. If a demo test and measurement device is available, the customer may schedule to have the test and measurement device shipped to them for a predetermined demo.

One drawback to this scenario is with regard to efficiency and immediacy of access to test and measure instruments that are not in the physical possession of the user. There is a problem with human nature being impetuous, once something catches a user's fancy, they may wish to acquire it now.

Finally, the most overlooked aspect of using test and measurement devices is the training. Many customers avoid training because of the time delay, cost and logistics involved. For a user to obtain a demonstration by a skilled engineer could cause a wait of many days or even weeks to be performed. Most measurement device manufacturers offer training, but at great cost to the customer for travel, lodging and production time.

Another problem with the lack of training for using test and measurement devices is that a new user may not know what results to expect. Therefore, it is difficult for the new user to determine whether the test and measurement device is functioning properly. Not only does the new user wish to talk to an expert there is a long-felt need that the experts see what the user is seeing to explain the function of the device.

A problem with resorting to contacting the vendor of the test and measurement device is that describing the behavior of the instrument over the telephone can be time consuming, frustrating, and many times, misleading.

Heretofore, test and measurement device manufacturers have a need for and lacked a system and method for remote demonstration and control of test measurement devices.

SUMMARY OF THE INVENTION

The present invention is generally directed to a system and method for remote demonstration and control of a test and measurement device.

Briefly described in architecture, the remote demonstration and control system can be implemented as follows. A client graphical user interface for providing interaction with a user and a client computer system is provided. The client graphical user interface permits the user to request active instrument panel pages from a server. The server includes an active server page, Active-X, and a standard instrument control library. The active server page is a page that emulates an instrument panel and includes remote scripting interfaces to provide constant update of the instrument panel page. The active server page connects to the Active-X or Dynamic Link Library application, which is the interface between the active server page and the standard instrument control library. The requests for update status data of a remote controlled instrument is processed by the standard instrument control library which provides the correct message format for data requests to the remote controlled instrument. The standard instrument control library issues the remote control request directly, or to a gateway that interfaces to the remote controlled instrument. The remote controlled instrument provides data, and reacts to commands received through the gateway. The instrument, upon receiving a command or request for instrument state data, transmits the instrument state data to the gateway for further transmission to the standard instrument control library. The standard instrument control library returns the instrument state data to the Active-X application, which then interfaces to and returns the instrument state data to the active server page. The active server page then transmits the instrument state data to the client user interface for further display to a user.

The present invention can also be viewed as a method for remote demonstration and control of a test and measurement device. In this regard, the following steps can broadly summarize the method. Connecting a communication line to the remote demonstration and control system, and powering up the remote demonstration and control system. The remote demonstration and control system automatically calls the call center on the connected communication link upon invocation. The remote demonstration and control system establishes the make and model of the connected test and measurement equipment. The test and measurement equipment receives instructions directing remote control of the connected test and measurement equipment from the remote demonstration and control system.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The accompanying drawings incorporated in and forming a part of the specification illustrate several aspects of the present invention, and together with the description, serve to explain the principles of the invention. In the drawings:

FIG. 6 is a flow chart of the remote demonstration and control client process, as shown in FIG. 5 above.

FIG. 7 is a flow chart of the web instrument panel server supporting the remote demonstration and control system of the present invention, as illustrated in FIG. 5 above.

FIGS. 8A–8C are flow charts of the method for generating the web based soft front panels utilized by the remote demonstration and control system of the present invention as illustrated in FIG. 5 above.

DETAILED DESCRIPTION OF THE PREFERRED EMBODIMENT

Figure 1:
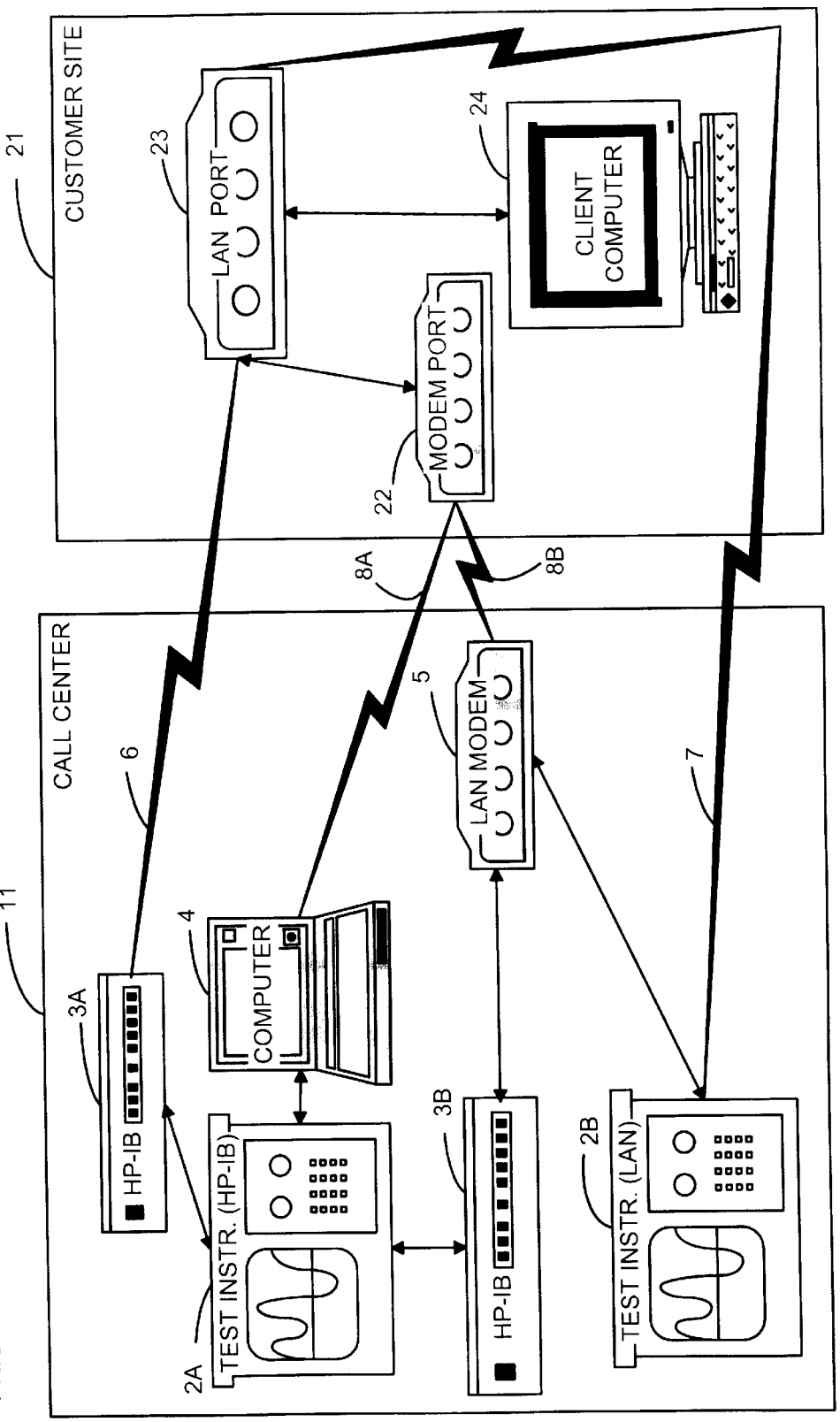
FIG. 1 is a block diagram showing five different prior art scenarios for a remote demonstration and training.

The invention will now be described with reference to the drawings, wherein like reference numerals designate corresponding parts throughout the several views. Although the invention will be described in connection with these drawings, there is no intent to limit it to the embodiment or embodiments disclosed therein. On the contrary, the intent is to include all alternatives, modifications, and equivalents included within the spirit and scope of the invention as defined by the appended claims.

Turning now to the drawings, FIG. 1 is a block diagram of five prior system configurations that illustrate the limitations of the prior art. In the first three prior art scenarios, the test instrument 2A, that is compatible with an HP-IB link, is connected to two HP-IB LAN converters, which are connected to a client computer 24 at a customer site. The HP-IB link complies with the IEEE-488 specification that set hardware and software specifications to allow connected devices to communicate. These devices are not necessarily test and measurement equipment, but today this is usually the case. IEEE-488 specification devices have a maximum transfer rate of 1MB/s.

In the first instance, the HP-IB compatible test instrument 2A is connected to the HP-IB LAN converter 3A for connection to a client computer 24 located at customer site 21 via the World Wide Web Internet link 6. The HP-IB LAN converter 3A at the call center 11 is connected via the Internet 6 to a LAN port 23 for the client computer 24.

In the second instance, the HP-IB compatible test instrument 2A is connected to an HP-IB LAN converter 3B that is connected to a LAN modem converter 5 for transmission of data across a regular PSTN or other network link 8B to the customer site 21. The PSTN or other network connection communication link 8B is connected to a modem port 22 that is connected to a LAN port 23 that is connected to the client computer 24.

The next scenario has the HP-IB compatible test instrument 2A connected to a computer 4 having an internal HP-IB interface and modem that is connected to the customer site 21 via PSTN or other network communication link 8A. The communication link 8A is connected to the modem port 22 that is connected to the LAN port 23 that is connected to the client computer 24.

The fourth prior art scenario for connecting a test instrument to a client computer is illustrated via the connection of the LAN based test instrument 2B to the LAN modem 5 that is connected to the customer site 21 via PSTN or other network communication link 8B. Communication link 8B is then connected to the modem port 22 that is connected to the LAN port 23 of the client computer 24.

The last scenario has the LAN based test instrument 2B connected directly to the LAN port 23 that is connected to the client computer 24.

All of the above scenarios involve the ability of assuming remote control of a customer system for the purpose of solving technical problems and performing demonstrations where an engineer is unavailable to go to the site because of the site's remote location or due to time and cost constraints.

Another option would be to send a portable laptop computer to the customer site 21 for remote demonstration. The portable computer would contain a HP-IB PCMCIA card to enable the remote control capability through such remote control software such as Microcom's carbon copy.

One limitation with all of the prior art scenarios is that it is only possible to transmit virtual panels of the test and measurement devices. These virtual panels, while providing real stimulus or response scenarios for actual live instrumentation, required extensive reconfiguration of the client (customer) computer system.

Figure 2:
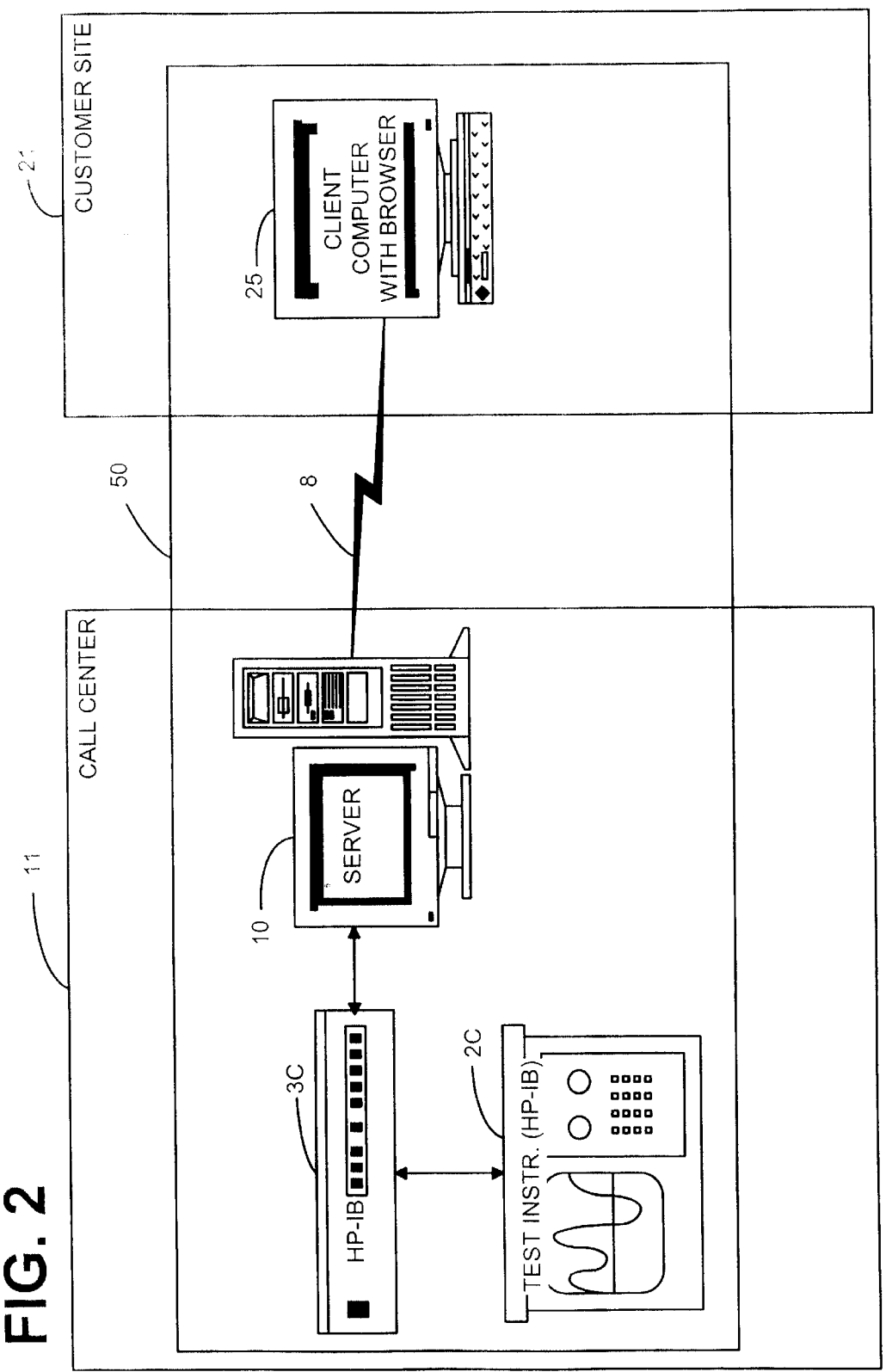
FIG. 2 is a block diagram showing the remote demonstration and control system of the present invention.

Illustrated in FIG. 2 is a block diagram of the remote demonstration and control system 50 of the present invention. The call center 11 contains the HP-IB based test instrument 2C which is connected to the HP-IB LAN converter 3C, which is connected to the remote demonstration and control server 10 of the present invention. The remote demonstration and control server 10 is herein defined in further detail with regard to FIGS. 4, 5, and 7.

The remote demonstration and control server 10 is connected via a PSTN, Internet, or other network communication link 8 to the client computer which includes a browser program. The client computer 25 with a browser is herein defined in further detail with regard to FIGS. 3, 5, and 6. The inventors contemplate that communication link 8 can be a PSTN, ISDN, Internet, or some other type of wide or local area network.

Figure 3:
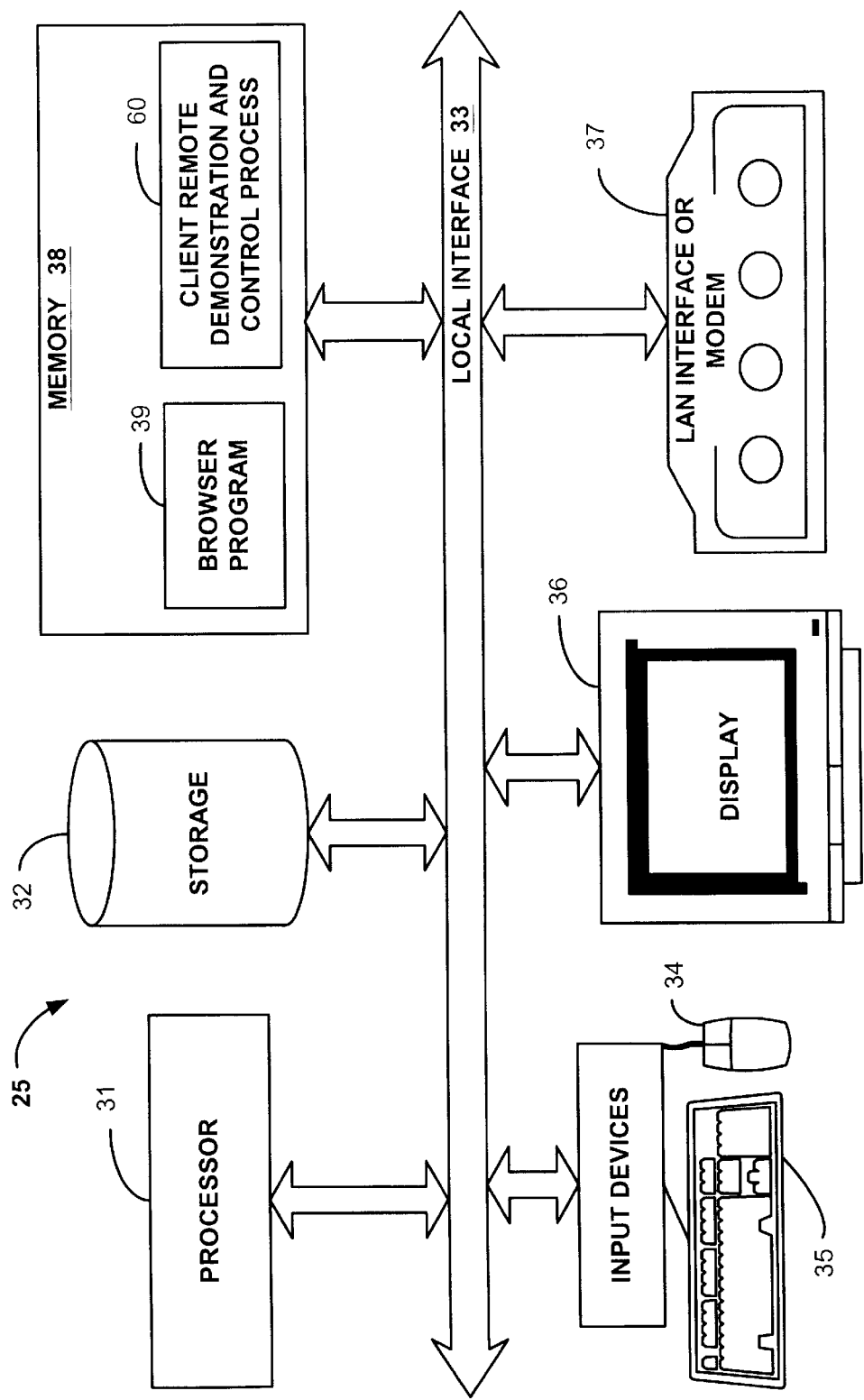
FIG. 3 is a block diagram illustrating a browser program situated within a computer readable medium, for example, in a computer system of a client system.

As illustrated in FIG. 3, client systems today generally include a browser application 39 (e.g., Netscape, Internet Explorer, or other browser application) for use in accessing locations on a network. As is well known, browser applications are provided and are readily available for a variety of hardware platforms. Browsers are most commonly recognized for their utility for accessing information over the Internet (not shown). As mentioned above, a browser is a device or platform that allows a user to view a variety of service collections. The browser retrieves information from server 10 using hypertext transfer protocol (HTTP), then interprets hypertext markup language (HTML) code, formats, and displays the interpreted result on a workstation display.

These browsers 39 reside in computer memory 38 and access LAN or modem interface 37 to transport the user to other resources connected to the communication link 8. In order to find a resource, the user should know the network location of the resource denoted by a network location identifier or uniform resource locator (URL). These identifiers are often cryptic, following very complex schemes and formats in their naming conventions.

Client systems 25 today identify, access, and process these resources desired by a user by using the processor 31, storage device 32, and memory 38 with an operating system (not shown). The processor 31 accepts data from memory 38 and storage device 32 over the logical interface 33. Memory 38 can be either one or a combination of the common types of memory, for example, but not limited to, erasable programmable read only memory (EPROM), electronically erasable programmable read only memory (EEPROM), flash memory, programmable read only memory (PROM), random access memory (RAM), read only memory (ROM), flash memory, Dynamic random access memory (DRAM), Static random access memory (SRAM), or system memory etc, with an operating system (not shown). Storage device 32 can be either one or a combination of the common types of storage devices, for example, but not limited to, a nonvolatile memory such as disk drives, tape drives, compact disc read only memory (CD-ROM) drives, cartridges, or cassettes. Directions from the user can be signaled to the computer by using the input devices, such as mouse 34 and keyboard 35. The actions input and result output are displayed on the display terminal 36.

The first embodiment of the present invention involves the browser 39. The browser 39 is the software that interacts with the server to obtain the requested data and functionality requested by the client user. The client browser 39 will be described hereafter in detail with regard to FIGS. 5 and 6.

Figure 4:
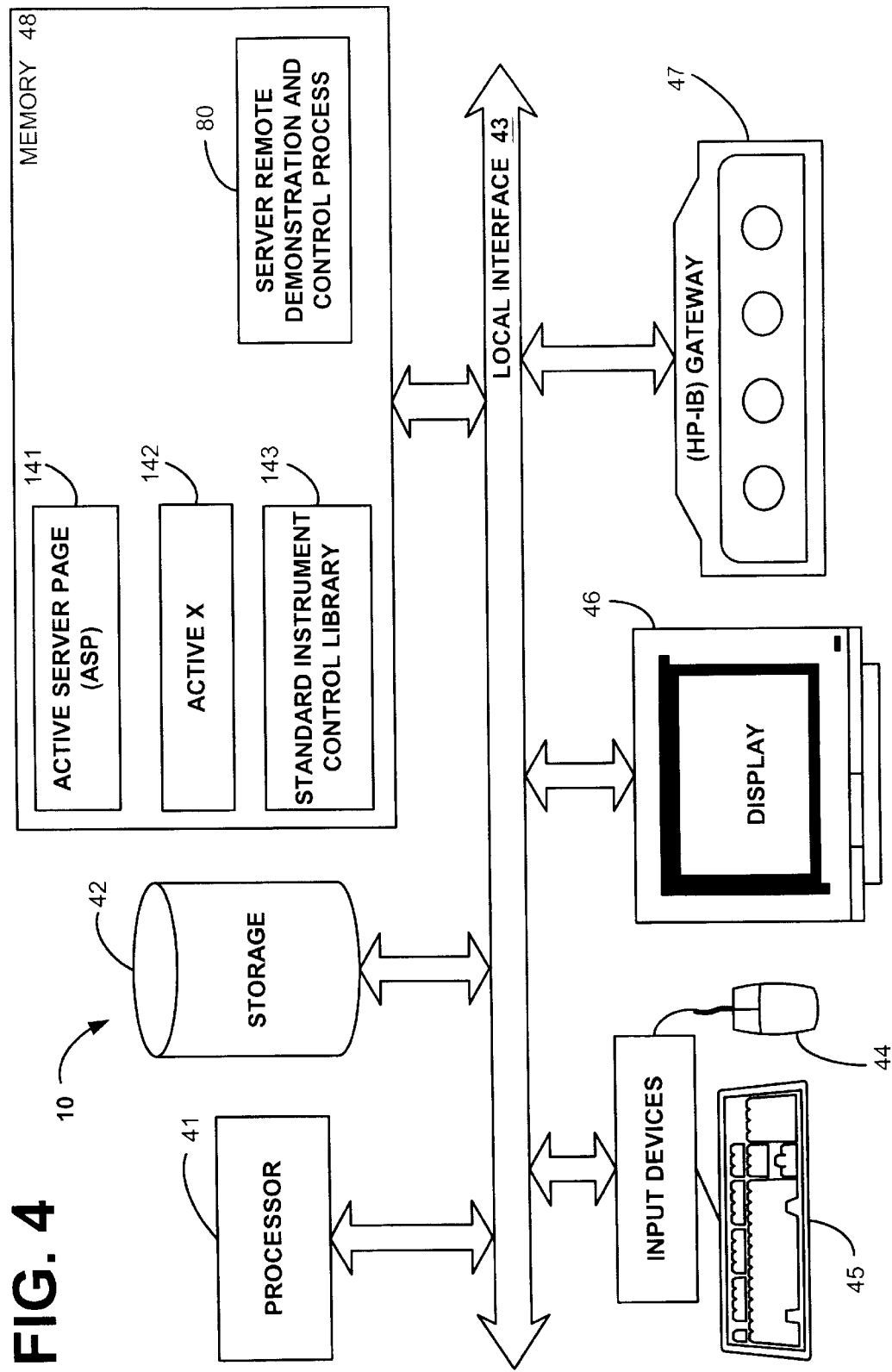
FIG. 4 is a block diagram illustrating a server's active server page program, the Active-X program and the standard instruments control library situated within a computer readable medium, for example, in a computer system of the server system.

Illustrated in FIG. 4 is the architecture of the server system 10. The principal difference between the server 10 and the client 25 illustrated in FIG. 3, is that the client system 25 interfaces with the user and requests functionality through the browser 39, while the server 10 provides the services requested by the client system 25. The server 10 provides the services requested by utilizing the active server page 141, Active-X application 142 and standard instrument control library 143.

Otherwise, the functionality of processor 41, storage device 42, mouse 44, keyboard 45, display 46, and gateway 47 are essentially similar to corresponding items and client system 25 of FIG. 3 described above.

The principal difference in server 10 and client system 25 is that the memory 48 interacting with the operating system (not shown) provides the services requested by the client utilizing the active server page 141, Active-X application 142 and standard instrument control library 143. Active server page 141, Active-X application 142 and standard instrument control library 143 will herein be defined in more detail with regard to FIGS. 5, 7 and 8A–8C.

Figure 5:
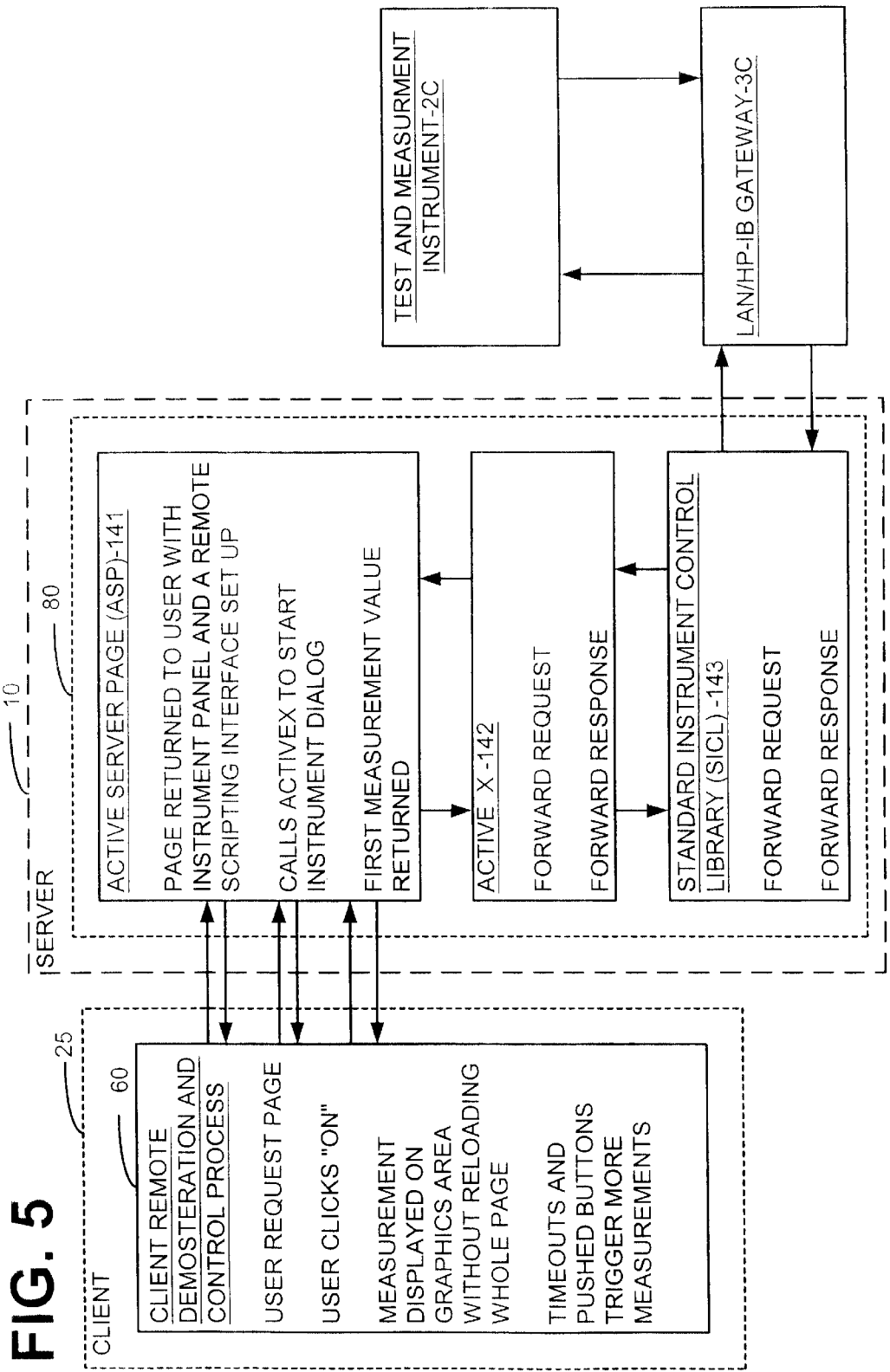
FIG. 5 is a block diagram showing the flow of data between the client user interface browser, the active server, the LAN gateway and the test and measurement instrument of the present invention.

Illustrated in FIG. 5 is a block diagram of an example of a possible process flow of the remote demonstration and control system 50. The client computer 25, as previously discussed with regard to FIG. 3 contains a client user interface or browser 39. The browser 39 provides for interaction between a user and the client computer 25. The browser 39 allows a user to request an active server page from the server 10 operating within the call center 11. The call center server 10 returns to the user an active server page instrument panel page with a remote scripting interface.

The server is comprised of three basic components: an active server page 141; an Active-X 142; and a standard instrument control library 143. It is preferred that the Hewlett-Packard Standard Instrument Control Library be utilized as the standard instrument control library in order to support Hewlett-Packard's input/output cards. These cards are needed to communicate with Hewlett-Packard test and measurement devices. However, other instrument control libraries can be utilized to support other vendor test and measurement devices. The active server page 141, Active-X 142 and standard instrument control library 143 are herein defined in further detail with regard to FIGS. 7 and 8A through 8C.

The active server page 141, after receiving a request for an instrument panel page, calls the Active-X 142 to start the instrument dialog. The Active-X 142 receives a request to start instrument dialog from the active server page 141 and forwards the request to the standard instrument control library 143. The standard instrument control library 143 receives the request to start the instrument dialog and identifies the test and measurement instrument to be connected and formats the request to start instrument dialog for the specified test and measurement equipment 2C. The properly formatted request to start the instrument dialog for the particular test and measurement instrument is then forwarded to the HP-IB LAN gateway 3C for further transmission to the desired test and measurement device 2C.

The test and measurement device 2C responds with the current instrument status data to the HP-IB LAN gateway 3C. The HP-IB LAN gateway 3C returns the response for instrument status data to the Active-X 142. For test and measurement devices 2C which have LAN interfaces 37 (FIG. 3), the need for HP-IB LAN gateway 3C is eliminated and the standard instrument and control library 143 communicates directly with test and measurement devices 2C.

The standard instrument and control library 143, after receiving the instrument status data from the HP-IB LAN gateway 3C converts the status instrument data to the proper form and forwards the test and measurement status data to the Active-X 142. The Active-X 142 processes and forwards the test and instrument status data to the active server page 141. The active server page 141 processes the instrument status data and transmits the instrument status data to the browser 39 running on the client computer 25.

The browser 39 displays the test and instrument status data on a graphics area without reloading the entire instrument panel page. The browser then waits for timeouts or input from a user (i.e., buttons to be pushed) to trigger additional updates to the test and measurement device status data for additional measurements. The request for updates to test and measurement instrument data is then transmitted from the browser 39 to the active server page 141 that repeats the process for the status data previously discussed.

Illustrated in FIG. 6 is a flow chart of a possible implementation for the remote demonstration and control process 60 in the client computer 25 within remote demonstration and control system 50 of the present invention. The remote demonstration and control process 60 within the client computer browser 39 is first initialized at step 61. The demonstration and control process 60 within the client computer browser 39 is first initialized at step 61. At step 62, the client remote demonstration and control process 60 establishes a connection between the server 10 and the client remote demonstration and control process 60. The server 10, upon establishing contact with the client remote demonstration and control process 60, then establishes a connection with the test and measurement device 2C that is herein defined in further detail with regard to FIG. 7.

At step 63, the client remote demonstration and control process 60 then requests instrument data from the test and measurement device 2C through the server 10 by requesting an instrument page from the server 10. The client remote and control process 60 receives an instrument page from the server 10 and allows initiation of remote control at step 64. The remote control initiation opens a session to the dynamic link library (DLL) of Active-X 141 and will place the instrument 2C into a known state (usually resets the remote instrumentation). This is performed so that when the user starts pressing the buttons on the client web page, undesired results that may occur due to instrument setting conflicts will be avoided.

Next, at step 65, the client remote demonstration and control process 60 receives test and measurement instrument data from the server 10 and displays the test and instrument measurement data on the graphics area without reloading the entire page. Examples of the instrument panel graphics areas are herein defined in further detail with regard to FIGS. 9 and 10. The generation of updates to the test and instrument measurement data is herein defined in further detail with regard to FIGS. 7 and 8A through 8C.

At step 66, the client remote demonstration and control process 60 determines whether the timeout or trigger for more measurements has occurred. If so, client remote demonstration and control process 60 returns to step 65 to receive additional test and instrument measurement data for display in the graphics area of the client computer 25 without reloading the entire page. If the timeouts or triggers for more measurements are not selected, then the client remote demonstration and control process 60 exits at step 69.

Illustrated in FIG. 7 is a flow chart of an example of possible implementation of the call center remote demonstration and control process 80 within remote demonstration and control system 50 of the present invention. First, the call center remote demonstration and control process 80 is initialized on the call center server 10 at step 81. This start-up and initialization step is generally performed first at the call center remote demonstration and control process 80 to accept connections to various client computers 25 throughout the day.

The call center remote demonstration and control server 10 next waits to receive a connection from the client computer 25 at step 82. At step 83, the call center remote demonstration and control process 80 on the call center server 10, returns the requested instrument panel page and remote script interface to the client computer 25 that dialed up requesting service.

At step 84, the call center remote demonstration and control process 80 calls Active Server Page process 141 to start or continue the instrument dialog. At step 85, the Active-X 142 then calls the standard instrument and control library 143 to convert the request for service into a compatible test and measurement device protocol. The standard instrument and control library 143 then requests and receives test and measurement device data from the test and measurement device 2C (FIG. 5) connected to the remote demonstration and control server 10 connected through the LAN HP-IB gateway 3C (FIG. 5). The test and measurement device data received from the test and measurement instrument 2C through the HP-IB LAN gateway is then returned to the client remote demonstration and control process 60 at step 87.

At step 88, the call center remote demonstration and control process 80 next determines whether the remote demonstration and control is to continue for the current client remote demonstration and control process 80. If the remote demonstration and control is to continue for the current client remote demonstration and control process 80, the server remote demonstration and control process 80 returns to step 84 to continue instrument dialog and request continuous updates from the test and measurement device 2C.

If the current client remote demonstration and control process 80 is to be discontinued at step 88, the server remote demonstration and control process 80 determines whether any new clients are waiting to connect to the call center remote demonstration and control process 80 on the call center server 10, at step 89.

If the client remote demonstration and control processes 80 are to be serviced, the server remote demonstration and control process 80 returns to step 82 to await a client remote demonstration and control process 80 request for service. If no new clients are to be serviced, the server remote demonstration and control process 80 exits at step 91.

Figure 8B:
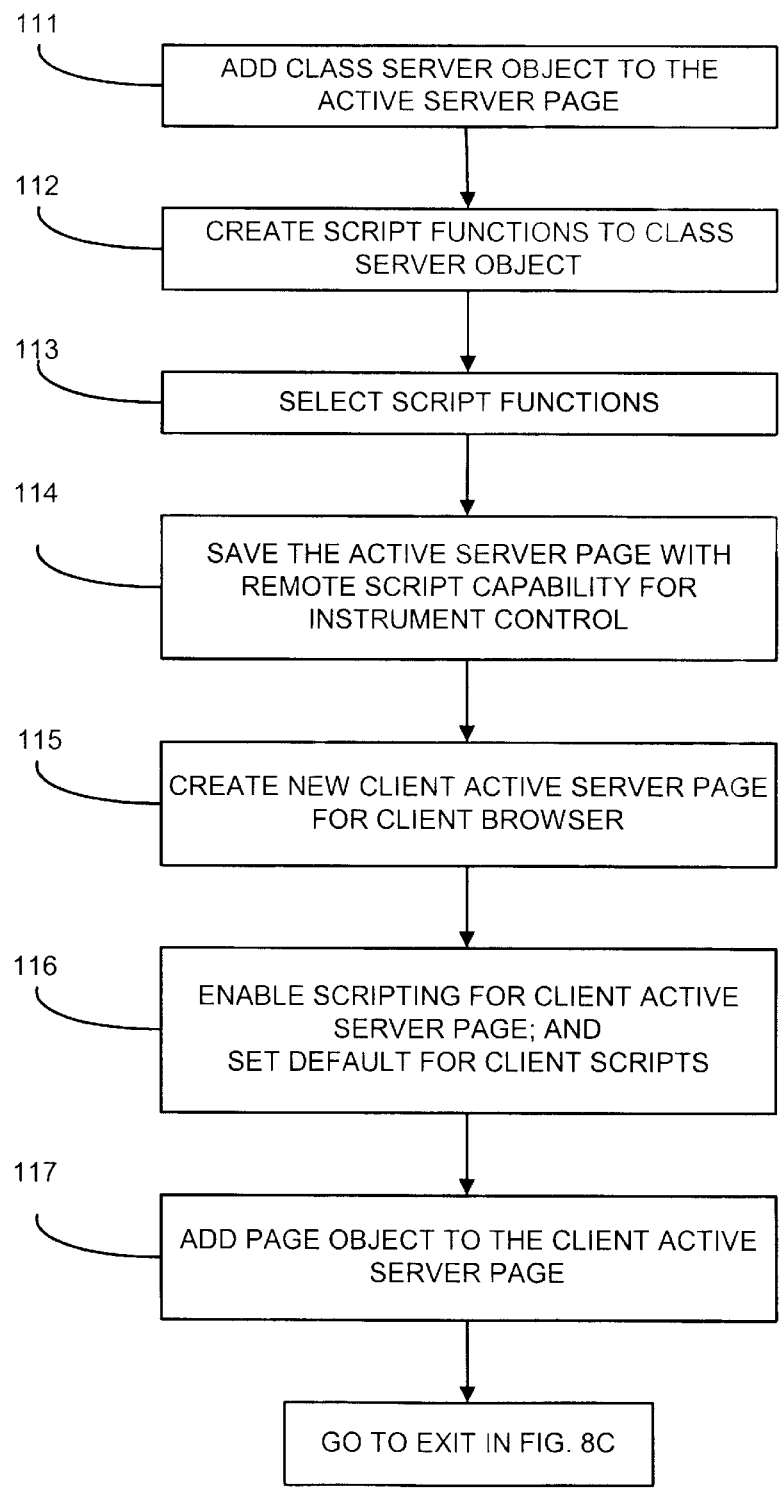
Figure 8C:
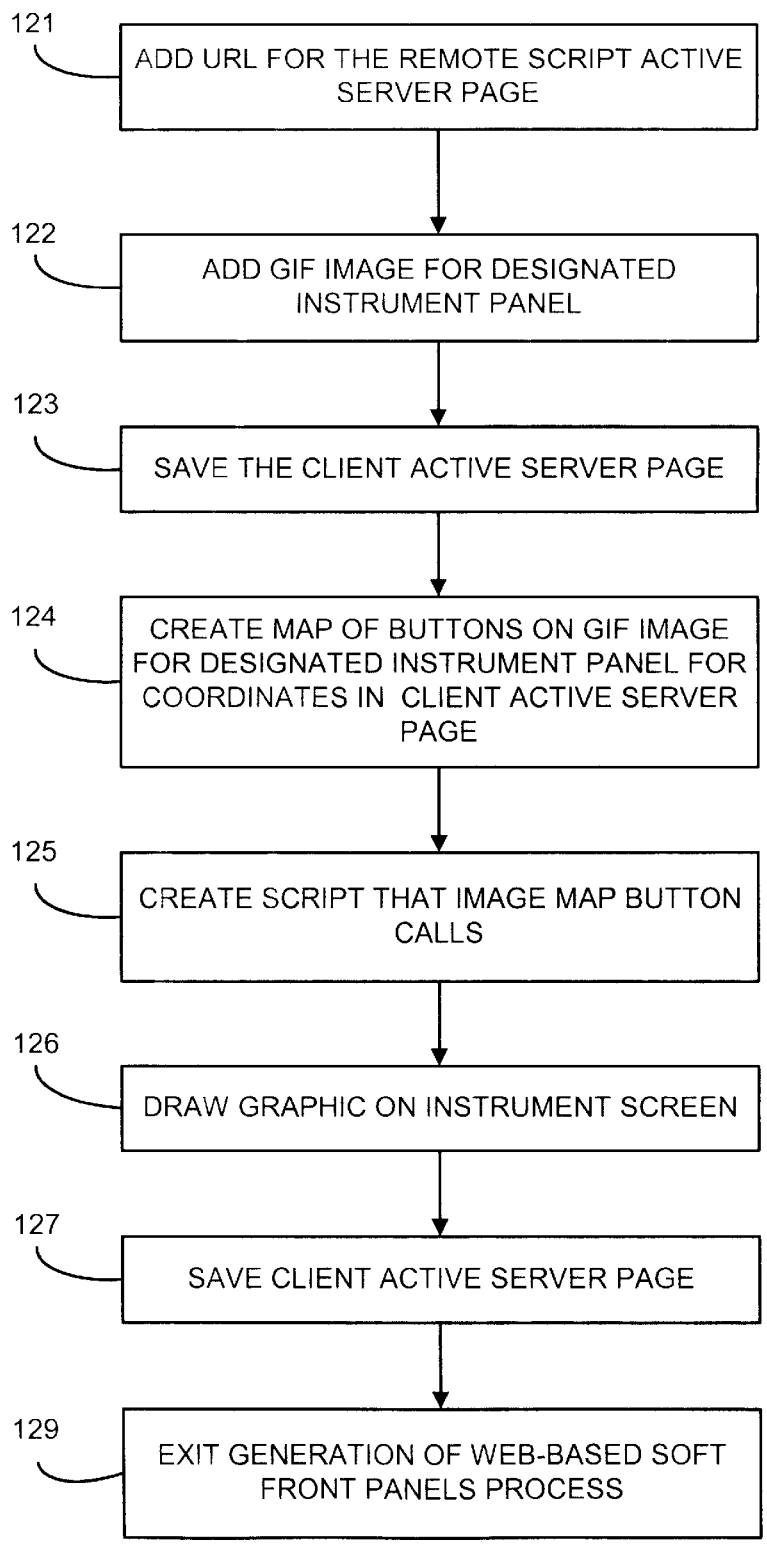

Illustrated in FIG. 8A–8C are flow charts of an example of a possible implementation for generation of the web based soft front instrument panel process 100 utilized by the remote demonstration and control system 50 of the present invention. First, at step 101, the web based soft front instrument panel generation process determines whether the standard instrument control library 143 and Active-X control 142 is present. If the standard instrument control library 143 or Active-X 142 are not present the web based soft front instrument panel generation process 100 then proceeds to step 129 to exit.

If both the standard instrument control library 143 and the Active-X 142 are present, the web based soft front instrument panel generation process 100 then installs and configures the input and output libraries at step 102. The generation process 100 then installs and configures the web server data at step 103.

Next, at step 104, the instrument panel generation process 100 creates a new active server page with the ability to import objects. The active server page created has the Active-X or DLL control parameters added at step 105. Next, at step 106, the instrument panel generation process 100 enables the scripting for the active server page created at step 104 and sets the default for the server 10 and the client computer 25 scripts. At step 107, the instrument panel generation process 100 then adds a page object to the active server page created at step 104. Next, the instrument panel generation process 100 adds a class server object to the active server page at step 111. Next, at step 113, the instrument panel generation process 100 creates a script function for the class server object and, at step 113, selects the script functions to be added to the class server object. Next, the instrument panel generation process 100 saves the active server page with the remote script capability at step 114.

Then, the instrument panel generation process 100 creates a new client active server page for the client browser 39 at step 115. The new client active server page is enabled for scripting and the defaults are set for the client scripts at step 116. At step 117, the instrument panel generation process 100 adds the page object to the client active server page. The instrument panel generation process 100 then adds the URL entry type for the client remote script active server page at step 121. The instrument panel generation process 100, at step 122, adds a graphics interchange format (GIF) image that represents the picture of the front panel of the test and measurement instrument that the active server page is being written for and saves the client active server page at step 123. It contemplated binding banners that other type of images may be utilized.

The instrument panel generation process 100, at step 124, then creates a map of buttons on the GIF image for the designated instrument panel for coordinates in the client active server page as added at step 122 above. Next, at step 125, the instrument panel creation process creates the script that the image map buttons will call. The functions will make the function calls to the remote script active server page at step 125. At step 126, the instrument panel generation process 100 draws the GIF image graphic on the instrument screen. One method used to draw graphics on the instrument screen places an Active-X control on the remote script active server page and sized it to be a black rectangle. Then when the text of the current measurement is to be displayed, writing to another property of this Active-X control is performed to set it's text value. Other drivers have different controls that are used (i.e. draw graphics of waveform) and therefore will have a different code.

The instrument panel generation process 100 then saves the client active server page at step 127 and exits the generation of the web based soft front instrument panel process 100 at step 129.

Figure 9:
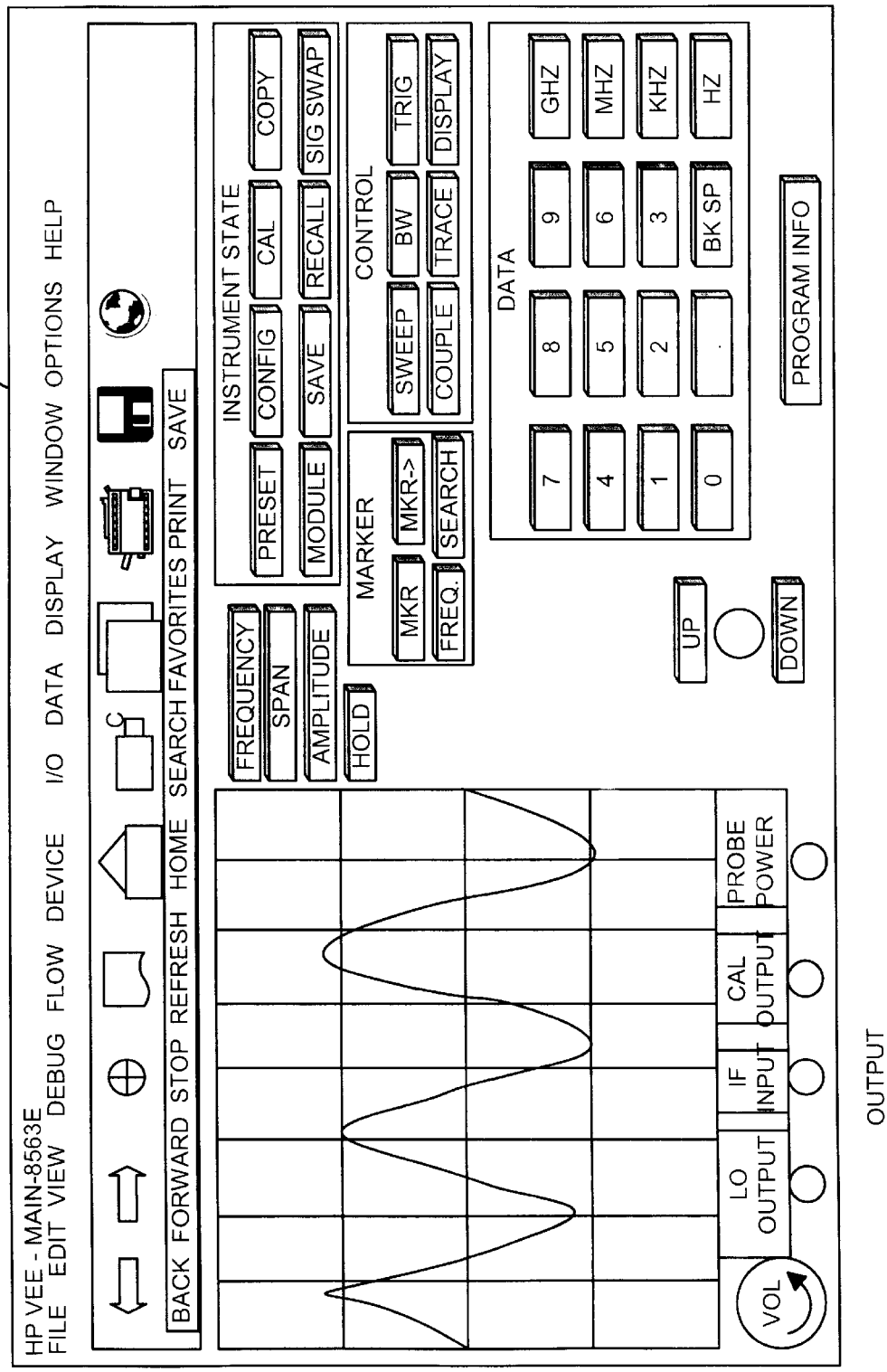
FIG. 9 is an example showing a virtual panel of an HP L1500A spectrum analyzer that provides a user wit h the ability to remotely illustrate and control a connected test and measurement device of the present invention.
Figure 10:
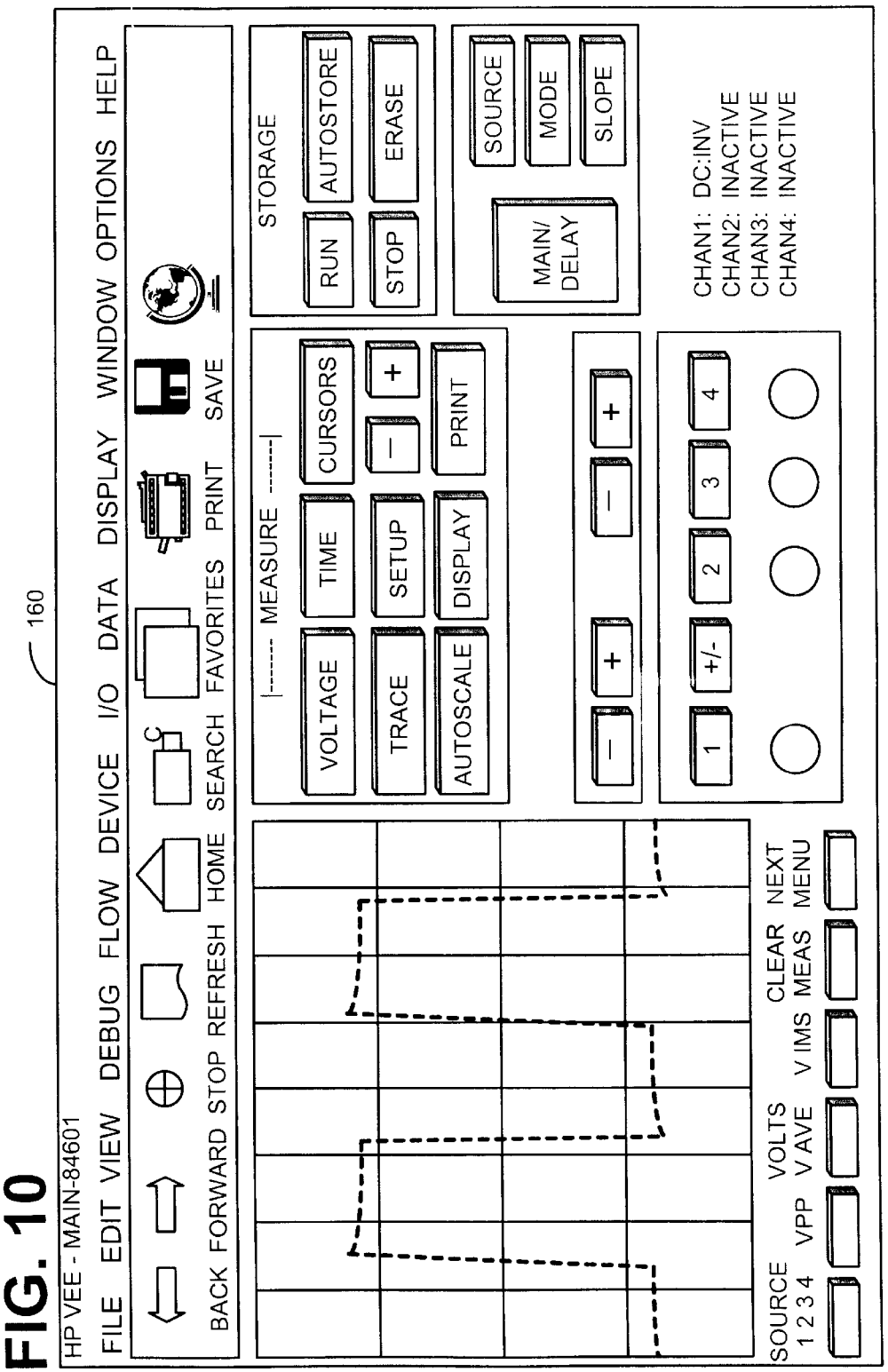
FIG. 10 is an example showing a virtual panel of a HP 54600B oscilloscope that provides a user with the ability to remotely illustrate and control a connected test and measurement device of the present invention.

Illustrated in FIGS. 9 and 10 are possible examples of the web based soft front instrument panels generated in the generation process 100. These soft front panels are from two different instruments. FIG. 9 is an L1500A Spectrum Analyzer 150 and FIG. 10 is a 54600B Oscilloscope 160. These panels in FIGS. 9 and 10 were included to demonstrate the respective capabilities of the instruments without requiring the customer to have the instrument on their site. This demonstrates that the system engineer could connect a signal to the instrument and the customer could adjust the settings and visually see the affect this had on the measurements.

The remote demonstration and control system 50, comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More is specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CD-ROM) (optical).

Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings.

The embodiment or embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for remote demonstration of a testing device, the method comprising the steps of:
    connecting a communication link to a remote controlling device;
    establishing a connection between said remote controlling device and a control server connected to said communication link, said control server being connected to said testing device;
    establishing a model information corresponding to the testing device;
    transmitting said model information to said remote controlling device for analysis;
    controlling said testing device remotely using input from an interactive instrument panel on said remote controlling device that is transmitted to said control server, and said control server formats and forwards the input to said testing device, said interactive instrument panel representative of said testing device; and
    displaying updated status data received from said testing device on said interactive instrument panel.

2. The method of claim 1, further comprising the step of:
    initializing said remote controlling device to control said testing device using said model information.

3. The method of claim 1, wherein said step of controlling said testing device remotely further comprises the steps of:
    submitting instructions to said interactive instrument panel on said remote controlling device; and
    forwarding said instructions to said testing device.

4. The method of claim 1, wherein said step of controlling said testing device remotely further comprises the step of:
    using a control library by said control server to convert said input into control data recognized by said testing device.

5. The method of claim 1, wherein said step of displaying updated status data from said testing device on said interactive instrument panel further comprises the step of:
    receiving updated status data continuously from said testing device.

6. A remote controlling system for remote demonstration of a testing device, said remote controlling system comprising:

a control server connectable to said testing device, said control server capable of formatting and forwarding control data to said testing device;

a remote controlling device with a connection interface for establishing a connection between said remote controlling device and said control server on a communication link;

a second programmable logic to establish model information of said testing device;

an interactive instrument panel on said remote controlling device, said interactive instrument panel representative of said testing device;

a first programmable logic for controlling said testing device remotely using input from said interactive instrument panel that is transmitted to said control server; and a display for displaying updated status data from said testing device on said interactive instrument panel.

7. The system of claim 6, wherein said second programmable logic further initializes said remote controlling device to control said testing device using said model information.

8. The system of claim 6, wherein said interactive instrument panel further receives remote control instructions.

9. The system of claim 8, further comprising:

a third programmable logic for forwarding said remote control instructions to said testing device.

10. The system of claim 6, wherein said display further receives updated status data continuously from said testing device, and wherein said display further updates said status data display continuously.

11. The system of claim 6, further comprising:

a control library used by said control server to convert said input into said control data recognized by said testing device.

12. A remote controlling system for remote demonstration of a testing device, said remote controlling system comprising:

means for connecting a communication link to a remote controlling device;

means for establishing a connection between said remote controlling device and a control server connected to said communication link, wherein said control server is connected to said testing device;

means for establishing model information of said testing device;

means for remotely controlling said testing device remotely using input from an interactive instrument panel means on said remote controlling device, wherein said input is transmitted to said control server, said interactive instrument panel means representative of said testing device;

means for formatting said input for transmission to said testing device; and means for displaying updated status data received from said testing device on said interactive instrument panel means.

13. The system of claim 12, wherein said means for establishing the model of the testing device further comprises:

means for initializing said remote controlling device to control said testing device using said model information.

14. The system of claim 12, wherein said interactive instrument panel means further comprises:

means for accepting remote control instructions.

15. The system of claim 12, wherein said remotely controlling means further comprises:

means for transmitting remote control instructions to said formatting means for delivery to said testing device.

16. The system of claim 12, wherein said displaying means further comprises:

means for continuously receiving updated status data from said testing device; and means for continuously displaying said updated status data.

17. system of claim 12, wherein said means for formatting further comprises:

means for converting said input into control data recognized by said testing device.

* * * * *